US011275284B2

(12) United States Patent
Numata et al.

(10) Patent No.: US 11,275,284 B2
(45) Date of Patent: Mar. 15, 2022

(54) DISPLAY DEVICE

(71) Applicant: Japan Display Inc., Tokyo (JP)

(72) Inventors: Yudai Numata, Tokyo (JP); Kentaro Okuyama, Tokyo (JP); Kojiro Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/231,179

(22) Filed: Apr. 15, 2021

(65) Prior Publication Data

US 2021/0232010 A1     Jul. 29, 2021

Related U.S. Application Data

(63) Continuation of application No. PCT/JP2019/038661, filed on Sep. 30, 2019.

(30) Foreign Application Priority Data

Oct. 19, 2018   (JP) .............................. JP2018-197676

(51) Int. Cl.
   *G02F 1/1362*    (2006.01)
   *G02F 1/1368*    (2006.01)
(52) U.S. Cl.
   CPC ...... *G02F 1/136286* (2013.01); *G02F 1/1368* (2013.01); *G02F 1/136209* (2013.01)
(58) Field of Classification Search
   CPC .............................................. G02F 1/136286
   See application file for complete search history.

(56) References Cited

U.S. PATENT DOCUMENTS

| 2003/0218701 A1 | 11/2003 | Kawakami |
| 2010/0085510 A1 | 4/2010 | Okuyama et al. |
| 2012/0288624 A1* | 11/2012 | Wu .................. G02B 5/201 |
| | | 427/162 |

(Continued)

FOREIGN PATENT DOCUMENTS

| CN | 107121829 | * | 9/2017 | .......... G02F 1/1333 |
| JP | 2003-330021 A | | 11/2003 | |

(Continued)

OTHER PUBLICATIONS

International Search Report dated Dec. 3, 2019 in PCT/JP2019/038661 filed on Sep. 30, 2019, citing documents AC-AD & AQ-AU therein, 2 pages.

*Primary Examiner* — Sang V Nguyen
(74) *Attorney, Agent, or Firm* — Oblon, McClelland, Maier & Neustadt, L.L.P.

(57) ABSTRACT

According to one embodiment, a display device includes a first substrate including a first transparent substrate, a wiring portion, and a pixel electrode, a second substrate including a second transparent substrate, a common electrode opposed to the pixel electrode, a light-shielding layer overlapping the wiring portion between the second transparent substrate and the common electrode, and a transparent layer disposed between the second transparent substrate and the light-shielding layer, a liquid crystal layer including a stripe-shaped polymer and liquid crystal molecules, and light-emitting elements. A refractive index of the transparent layer is less than a refractive index of the second transparent substrate.

17 Claims, 11 Drawing Sheets

(56) References Cited

U.S. PATENT DOCUMENTS

| | | | |
|---|---|---|---|
| 2014/0300845 A1* | 10/2014 | Tamaki | G02F 1/133514 |
| | | | 349/65 |
| 2015/0002791 A1 | 1/2015 | Nam et al. | |
| 2015/0299476 A1* | 10/2015 | Liu | G02F 1/133514 |
| | | | 359/892 |
| 2016/0070047 A1 | 3/2016 | Okuyama et al. | |
| 2016/0103531 A1* | 4/2016 | Kimura | G02F 1/13338 |
| | | | 345/174 |
| 2017/0031205 A1 | 2/2017 | Lee | |
| 2018/0052548 A1* | 2/2018 | Katsuta | G02F 1/13338 |
| 2019/0041673 A1* | 2/2019 | Numata | G02F 1/1334 |
| 2019/0079323 A1* | 3/2019 | Kurokawa | G02F 1/13452 |
| 2019/0324305 A1 | 10/2019 | Numata et al. | |

FOREIGN PATENT DOCUMENTS

| | | | | |
|---|---|---|---|---|
| JP | 2007-094254 | * | 4/2007 | |
| JP | 2007-094254 A | | 4/2007 | |
| JP | 2007-171460 A | | 7/2007 | |
| JP | 2010-092682 A | | 4/2010 | |
| JP | 2016-057338 A | | 4/2016 | |
| JP | 2007-094254 | * | 4/2017 | G02F 1/1333 |
| JP | 2019-191230 A | | 10/2019 | |
| WO | WO 2017/026478 A1 | | 2/2017 | |

\* cited by examiner

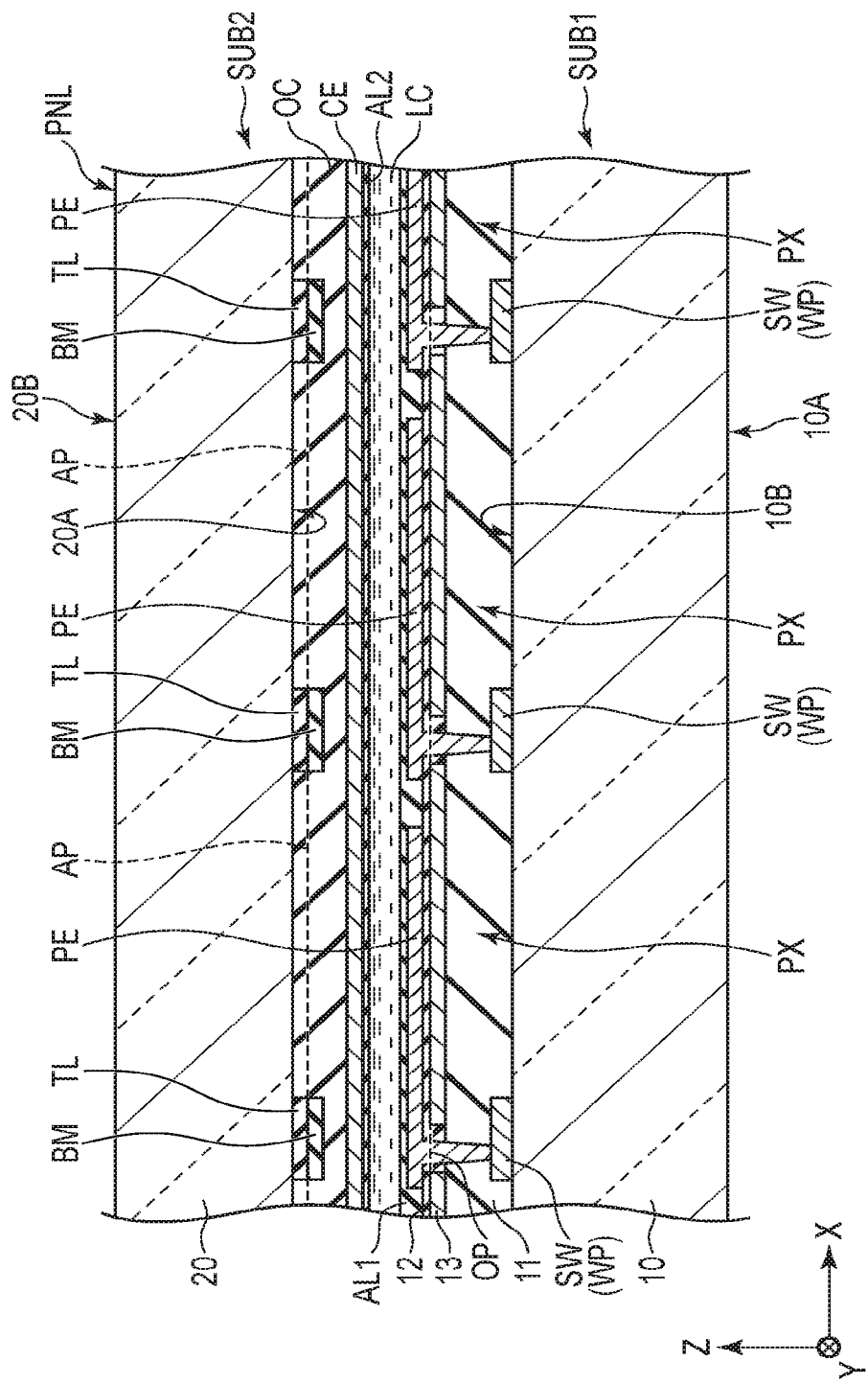
F I G. 2

DISPLAY DEVICE

CROSS-REFERENCE TO RELATED APPLICATIONS

This application is a Continuation Application of PCT Application No. PCT/JP2019/038661, filed Sep. 30, 2019 and based upon and claiming the benefit of priority from Japanese Patent Application No. 2018-197676, filed Oct. 19, 2018, the entire contents of all of which are incorporated herein by reference.

FIELD

Embodiments described herein relate generally to a display device.

BACKGROUND

Recently, various display devices have been proposed. In one example, an illumination device comprising a light modulation layer including a bulk and microparticles having optical anisotropy in a light modulation element bonded to a light guide plate has been disclosed. In another example, a light source device comprising a light conversion portion including a polymer dispersed liquid crystal layer and converting an incident light intensity has been disclosed.

BRIEF DESCRIPTION OF THE DRAWINGS

FIG. 2 is a cross-sectional view showing a configuration example of a display panel PNL shown in FIG. 1.

DETAILED DESCRIPTION

Figure 1:
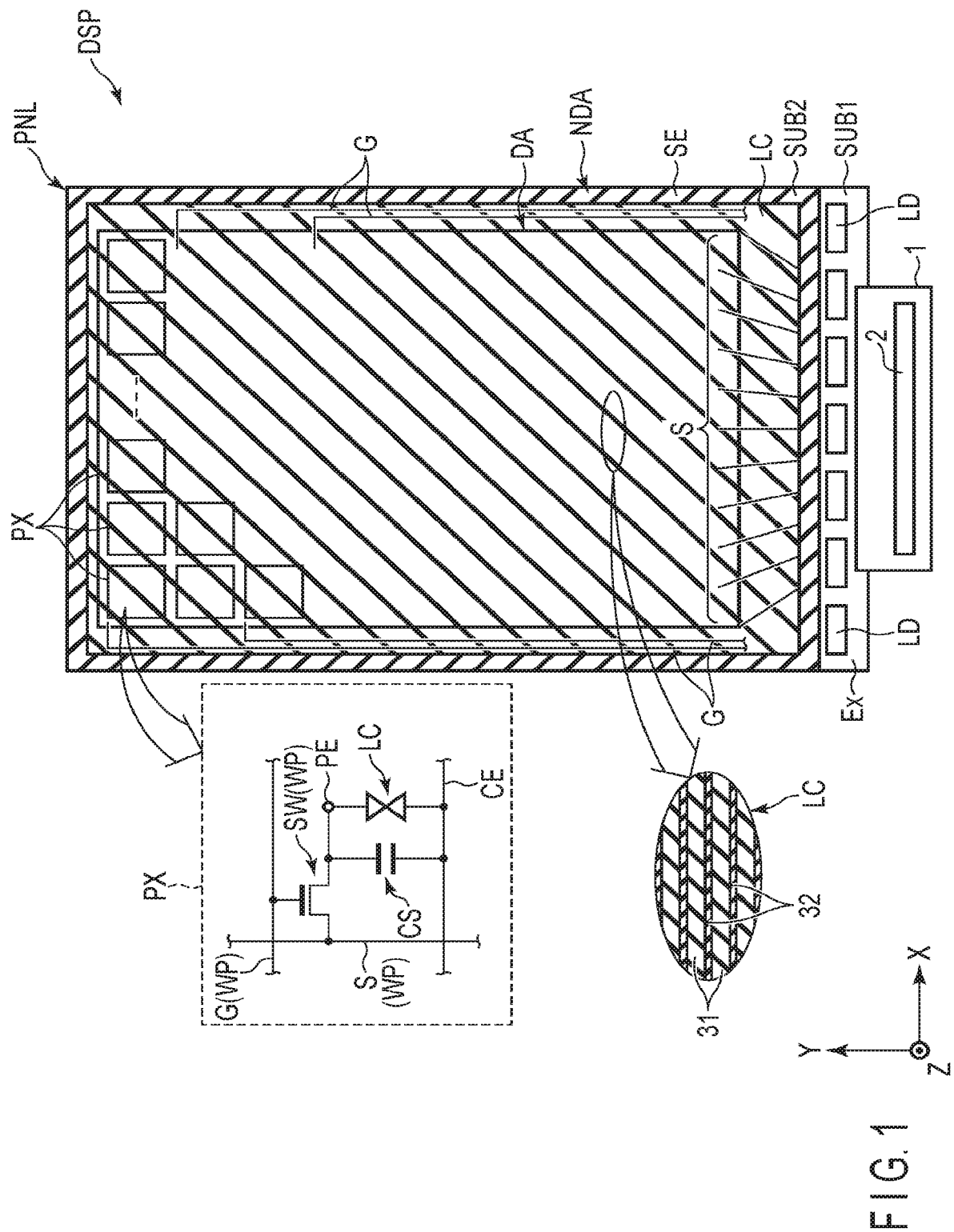
FIG. 1 is a plan view showing a configuration example of a display device DSP of the present embodiment.

In general, according to one embodiment, there is provided a display device comprising: a first substrate comprising a first transparent substrate, a wiring portion, and a pixel electrode electrically connected to the wiring portion; a second substrate comprising a second transparent substrate, a common electrode opposed to the pixel electrode, a light-shielding layer overlapping the wiring portion between the second transparent substrate and the common electrode, and a transparent layer disposed between the second transparent substrate and the light-shielding layer; a liquid crystal layer disposed between the first substrate and the second substrate and including a stripe-shaped polymer and liquid crystal molecules; and a plurality of light-emitting elements. A refractive index of the light-shielding layer is less than a refractive index of the second transparent substrate.

According to another embodiment, there is provided a display device comprising: a first transparent substrate; a second transparent substrate comprising a main surface and a side surface; a liquid crystal layer disposed between the first transparent substrate and the second transparent substrate, and including a stripe-shaped polymer and liquid crystal molecules; a light-shielding layer disposed between the second transparent substrate and the liquid crystal layer; a transparent layer disposed between the second transparent substrate and the light-shielding layer, and being in contact with the main surface; and a light-emitting element opposed to the side surface. The transparent layer is an insulating layer comprising an aperture.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference numbers, and detailed descriptions of them that are considered redundant may be omitted unless necessary.

FIG. 1 is a plan view showing a configuration example of a display device DSP of the present embodiment. In one example, a first direction X, a second direction Y and a third direction Z are orthogonal to one another. However, they may cross one another at an angle other than 90 degrees. The first direction X and the second direction Y correspond to directions parallel to the main surface of a substrate constituting the display device DSP, and the third direction Z corresponds to the thickness direction of the display device DSP. An observation position from which the display device DSP is observed is assumed to be located on a side on which the point of an arrow indicating the third direction Z is located, and viewing from this observation position toward an XY-plane defined by the first direction X and the second direction Y is referred to as planar view.

In the present embodiment, a liquid crystal display device employing a polymer dispersed liquid crystal is described as an example of the display device DSP. The display device DSP comprises a display panel PNL, a wiring board 1, an IC chip 2 and a light-emitting element LD.

The display panel PNL comprises a first substrate SUB1, a second substrate SUB2, a liquid crystal layer LC and a sealant SE. The first substrate SUB1 and the second substrate SUB2 overlap each other in planar view. The first substrate SUB1 and the second substrate SUB2 are bonded together by the sealant SE. The liquid crystal layer LC is held between the first substrate SUB1 and the second substrate SUB2, and is sealed in by the sealant SE. In FIG. 1, the liquid crystal layer LC and the sealant SE are indicated by different hatch lines.

As enlarged and schematically shown in FIG. 1, the liquid crystal layer LC comprises a polymer dispersed liquid crystal including a polymer 31 and liquid crystal molecules 32. In one example, the polymer 31 is a liquid crystal polymer. The polymer 31 is formed in a stripe shape extending along the first direction X. The liquid crystal molecules 32 are dispersed in gaps of the polymer 31, and are aligned such that major axes of them extend along the first direction X. The polymer 31 and the liquid crystal molecules 32 each have optical anisotropy or refractive anisotropy. The responsiveness to an electric field of the polymer 31 is less than the responsiveness to an electric field of the liquid crystal molecules 32.

In one example, the alignment direction of the polymer 31 hardly changes regardless of the presence or absence of an electric field. On the other hand, the alignment direction of each liquid crystal molecule 32 changes according to an electric field in a state where a high voltage of greater than or equal to a threshold value is applied to the liquid crystal layer LC. In a state where no voltage is applied to the liquid crystal layer LC, the optical axis of the polymer 31 and the optical axis of each liquid crystal molecule 32 are parallel to each other, and light entering the liquid crystal layer LC is transmitted almost without being scattered in the liquid crystal layer LC (transparent state). In a state where voltage is applied to the liquid crystal layer LC, the optical axis of the polymer 31 and the optical axis of each liquid crystal molecule 32 cross each other, and light entering the liquid crystal layer LC is scattered in the liquid crystal layer LC (scattering state).

The display panel PNL comprises a display portion DA which displays an image, and a frame-shaped non-display portion NDA which surrounds the display portion DA. The sealant SE is located in the non-display portion NDA. The display portion DA comprises pixels PX arranged in a matrix in the first direction X and the second direction Y.

As shown enlarged in FIG. 1, each pixel PX comprises a switching element SW, a pixel electrode PE, a common electrode CE, the liquid crystal layer LC and the like. The switching element SW is composed of, for example, a thin-film transistor (TFT), and is electrically connected to a scanning line G and a signal line S. A wiring portion WP disposed in the display portion DA comprises the scanning line G, the signal line S and the switching element SW.

The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. The common electrode CE is disposed common to the pixel electrodes PE. The liquid crystal layer LC (in particular, the liquid crystal molecules 32) is driven by an electric field produced between the pixel electrode PE and the common electrode CE. A capacitance CS is formed, for example, between an electrode of the same potential as the common electrode CE and an electrode of the same potential as the pixel electrode PE. In one example, the scanning line G, the signal line S, the switching element SW and the pixel electrode PE are disposed in the first substrate SUB1. The common electrode CE is disposed in the second substrate SUB2.

The wiring board 1 is electrically connected to an extension portion Ex of the first substrate SUB1. The wiring board 1 is a foldable flexible printed circuit board. The IC chip 2 is electrically connected to the wiring board 1. For example, a display driver which outputs a signal necessary for image display, etc., is incorporated in the IC chip 2. Note that the IC chip 2 may be electrically connected to the extension portion Ex.

The light-emitting element LD overlaps the extension portion Ex in planar view. A plurality of the light-emitting elements LD are arranged spaced apart from one another along the first direction X.

FIG. 2 is a cross-sectional view showing a configuration example of the display panel PNL shown in FIG. 1.

The first substrate SUB1 comprises a transparent substrate 10, insulating films 11 and 12, a capacitance electrode 13, the switching element SW, the pixel electrode PE and the alignment film AL1. The transparent substrate 10 comprises a main surface (lower surface) 10A and a main surface (upper surface) 10B on a side opposite to the main surface 10A. The switching element SW is disposed on a side on which the main surface 10B is located. The wiring portion WP is disposed between the transparent substrate 10 and the insulating film 11. In the illustrated example, the switching element SW of the wiring portion WP is disposed between the transparent substrate 10 and the insulating film 11. However, the scanning line G and the signal line S shown in FIG. 1 are also disposed between the transparent substrate 10 and the insulating film 11. The capacitance electrode 13 is disposed between the insulating films 11 and 12. The pixel electrode PE is disposed for each pixel PX between the insulating film 12 and the alignment film AL1. The pixel electrode PE is electrically connected to the switching element SW via an opening OP of the capacitance electrode 13. The pixel electrode PE overlaps the capacitance electrode 13 across the insulating film 12, and forms the capacitance CS of the pixel PX. The alignment film AL1 covers the pixel electrode PE.

The second substrate SUB2 comprises a transparent substrate 20, a transparent layer TL, a light-shielding layer BM, the common electrode CE, an overcoat layer OC and an alignment film AL2. The transparent substrate 20 comprises a main surface (lower surface) 20A and a main surface (upper surface) 20B on a side opposite to the main surface 20A. The main surface 20A of the transparent substrate 20 faces the main surface 10B of the transparent substrate 10.

The light-shielding layer BM is disposed between the liquid crystal layer LC and the transparent substrate 20, and is opposed to the wiring portion WP in the third direction Z. The light-shielding layer BM blocks light traveling from the transparent substrate 20 toward the wiring portion WP. In the illustrated example, the light-shielding layer BM is disposed directly above the switching element SW of the wiring portion WP. However, the light-shielding layer BM is also disposed directly above the scanning line G and the signal line S which are not shown in the drawing. In addition, the light-shielding layer BM is apart from the main surface 20A, in its entirety is directly stacked on the transparent layer TL, and is in contact with the overcoat layer OC.

The transparent layer TL is disposed between the transparent substrate 20 and the light-shielding layer BM. In the illustrated example, the transparent layer TL is in contact with the main surface 20A and the light-shielding layer BM. Another member may be interposed between the transparent layer TL and the light-shielding layer BM. The transparent layer TL is an insulating layer comprising an aperture AP opposed to the pixel electrode PE in the third direction Z.

The overcoat layer OC is, for example, a transparent organic insulating film, and directly covers the transparent layer TL and the light-shielding layer BM. The overcoat layer OC is in contact with the main surface 20A in the aperture AP. The common electrode CE is disposed over the pixels PX, and is opposed to the pixels PE in the third direction Z. The common electrode CE is electrically connected to the capacitance electrode 13 and has the same potential as the capacitance electrode 13. The common electrode CE is disposed between the alignment film AL2 and the overcoat layer OC.

The liquid crystal layer LC is disposed between the first substrate SUB1 and the second substrate SUB2, and is in contact with the alignment films AL1 and AL2.

The transparent substrates 10 and 20 each are an insulating substrate such as a glass substrate or a plastic substrate. The insulating film 11 is formed of a transparent insulating material such as silicon oxide, silicon nitride, silicon oxynitride or acrylic resin. In one example, the insulating film 11 includes an inorganic insulating film and an organic insulating film. The insulating film 12 is an inorganic insulating film such as silicon nitride. The capacitance electrode 13, the pixel electrode PE and the common electrode CE each are a transparent electrode formed of a transparent conductive material such as indium tin oxide (ITO) or indium zinc oxide (IZO). The alignment films AL1 and AL2 each are a horizontal alignment film having an alignment restriction force substantially parallel to the XY-plane. In one example, the alignment films AL1 and AL2 are provided with alignment treatment along the first direction X. The alignment treatment may be rubbing treatment or photo-alignment treatment.

The light-shielding layer BM may be a light absorption layer formed of a material having a light absorption property or a light reflection layer formed of a material having a light reflection property. In addition, the light-shielding layer BM may be an insulating layer formed of an inorganic material or an organic material or may be a conductive layer formed of a metal material.

The transparent layer TL is, for example, an insulating layer formed of a transparent organic material such as siloxane-based resin or fluorine-based resin.

Regarding a refractive index, a refractive index nTL of the transparent layer TL is less than a refractive index n20 of the transparent substrate 20. Note that a refractive index n10 of the transparent substrate 10 is equal to the reflective index n20. For example, the refractive indexes n10 and n20 are about 1.5, and the refractive index nTL is greater than or equal to 1.0 but less than or equal to 1.41.

In the example shown in FIG. 2, the main surface 20B of the transparent substrate 20 is in contact with air. However, another transparent substrate having an equal refractive index to the transparent substrate 20 may be bonded to the entire surface of the main surface 20B. In addition, another transparent substrate having an equal refractive index to the transparent substrate 10 may be bonded to the entire surface of the main surface 10A of the transparent substrate 10. Being "equal" here is not limited to when the refractive index difference is zero but also includes when the refractive index difference is less than or equal to 0.03.

Figure 3:
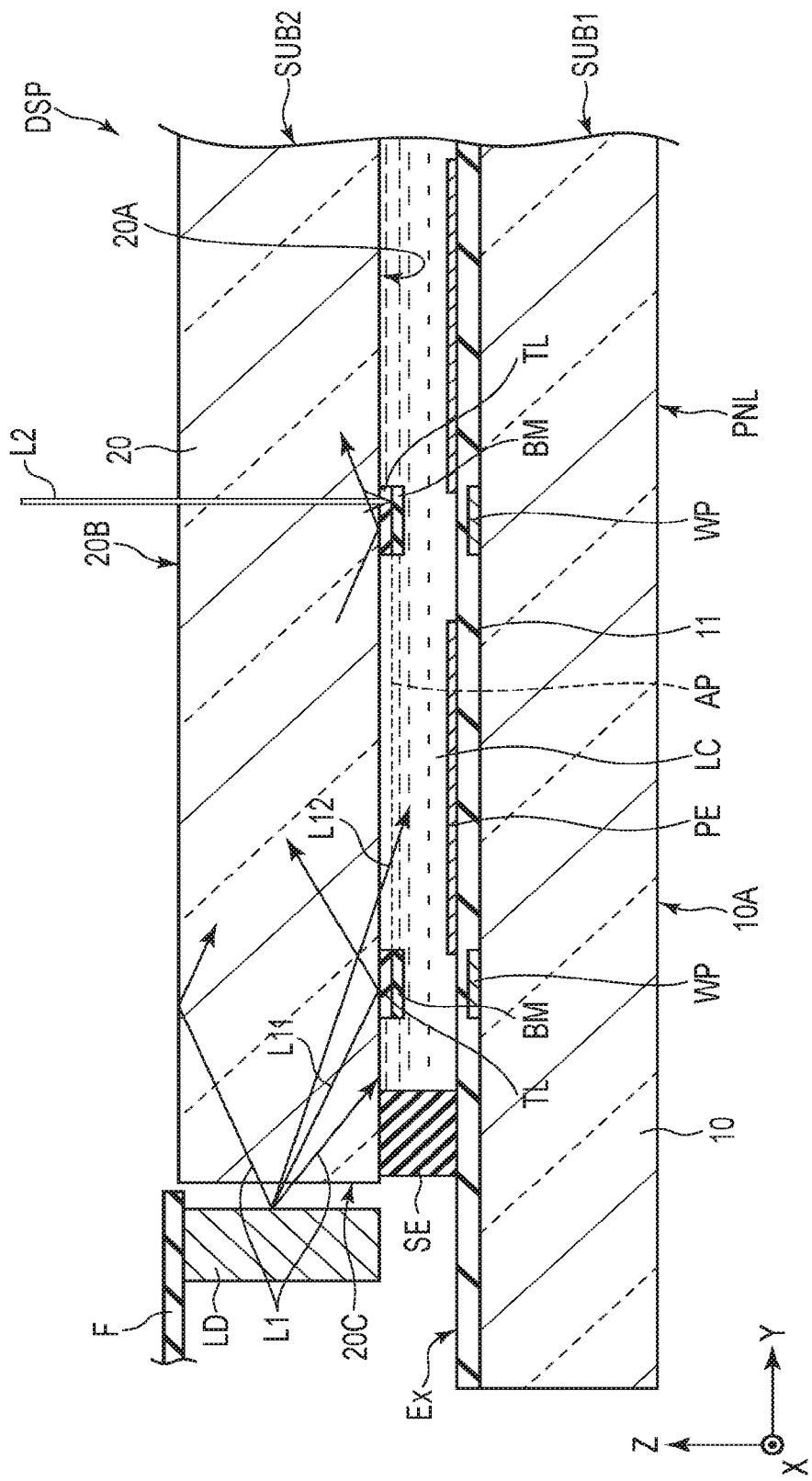
FIG. 3 is a cross-sectional view showing a configuration example of the display device DSP of the present embodiment.

FIG. 3 is a cross-sectional view showing a configuration example of the display device DSP of the present embodiment. Only the main part of the display panel PNL is illustrated, and the illustrations of the common electrode CE and the alignment films AL1 and AL2 are omitted.

The light-emitting element LD is opposed to a side surface 20C of the transparent substrate 20 in the second direction Y. The light-emitting element LD is electrically connected to the wiring board F. The light-emitting element LD is, for example, a light-emitting diode, and although not described in detail, the light-emitting element LD comprises a red light-emitting portion, a green light-emitting portion and a blue light-emitting portion. A transparent light guide may be disposed between the light-emitting element LD and the side surface 20C.

Next, light L1 emitted from the light-emitting element LD will be described with reference to FIG. 3.

The light-emitting element LD emits light L1 toward the side surface 20C. The light L1 emitted from the light-emitting element LD travels along the direction of an arrow indicating the second direction Y, and enters the transparent substrate 20 from the side surface 20C. The light L1 entering the transparent substrate 20 travels inside the display panel PNL while repeatedly reflected. At this time, light L11 toward the light-shielding layer BM of the light L1 is reflected at the interface between the transparent substrate 20 and the transparent layer TL and does not reach the light-shielding layer BM. In addition, light L12 toward the aperture AP of the light L1 enters the liquid crystal layer LC.

The light L12 entering the liquid crystal layer LC to which no voltage is applied is transmitted through the liquid crystal layer LC almost without being scattered. In addition, the light L12 entering the liquid crystal layer LC to which voltage is applied is scattered in the liquid crystal layer LC. The display device DSP can be observed from a side on which the main surface 10A is located, and can also be observed from a side on which the main surface 20B is located. In addition, regardless of whether the display device DSP is observed from the main surface 10A side or the main surface 20B side, the background of the display device DSP can be observed through the display device DSP.

According to the present embodiment, the light L11 toward the light-shielding layer BM of the light L1 traveling inside the transparent substrate 20 is reflected at the interface between the transparent substrate 20 and the transparent layer TL before reaching the light-shielding layer BM. Therefore, absorption of the light L11 in the light-shielding layer BM can be suppressed, and a decrease of the use efficiency of the light from the light-emitting element LD can be suppressed.

In particular, the display device DSP of the present embodiment is of such a type that the light L1 from the light-emitting element LD enters from the side surface 20C of the second substrate SUB2 and propagates through the display panel PNL. When attention is focused on luminance distribution in the display device DSP, the luminance tends to decrease as the distance from the light-emitting element LD increases. One cause of the decrease of the luminance is light absorption by the light-shielding layer BM. That is, the light-shielding layer BM absorbs a part of the light propagating while repeating total internal reflection a plurality of times inside the display panel PNL. Therefore, the luminance rapidly decreases as the distance from the light-emitting element LD increases.

According to the present embodiment, the decrease of the luminance can be suppressed by suppressing the light absorption in the light-shielding layer BM. Therefore, degradation of display quality can be suppressed.

In addition, if the light-shielding layer BM is a light absorption layer, light L2 from the outside of the display device DSP is absorbed in the light-shielding layer BM. Therefore, reflection and scattering of undesired external light at the light-shielding layer BM can be suppressed.

Figure 4:
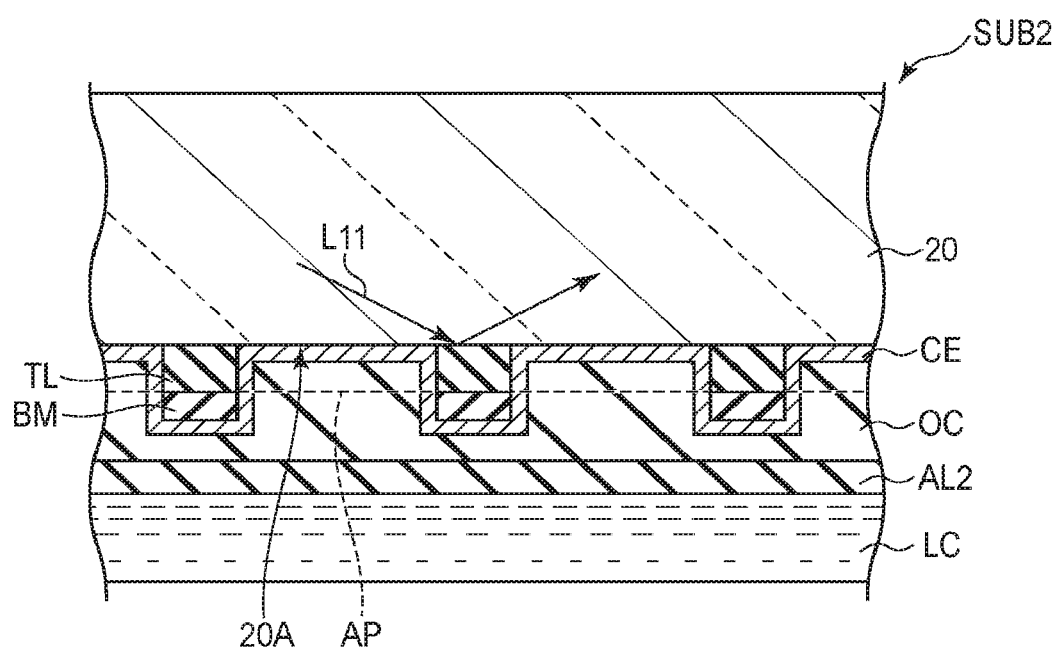
FIG. 4 is a cross-sectional view showing another configuration example of a second substrate SUB2.

FIG. 4 is a cross-sectional view showing another configuration example of the second substrate SUB2. The configuration example shown in FIG. 4 is different from the configuration example shown in FIG. 2 in that the common electrode CE directly covers the light-shielding layer BM and the transparent layer TL. In addition, the common electrode CE is in contact with the main surface 20A in the aperture AP. The overcoat layer OC is disposed between the common electrode CE and the alignment film AL2, and directly covers the common electrode CE.

In this configuration example, the light-shielding layer BM is formed as, for example, a conductive layer having a lower resistance than the common electrode CE. In one example, the light-shielding layer BM is formed of a non-transparent metal material such as molybdenum, aluminum, tungsten, titanium or silver. Since the common electrode CE is in contact with the light-shielding layer BM, the common electrode CE is electrically connected to the light-shielding layer BM. Accordingly, the common electrode CE is made less resistive.

Figure 5:
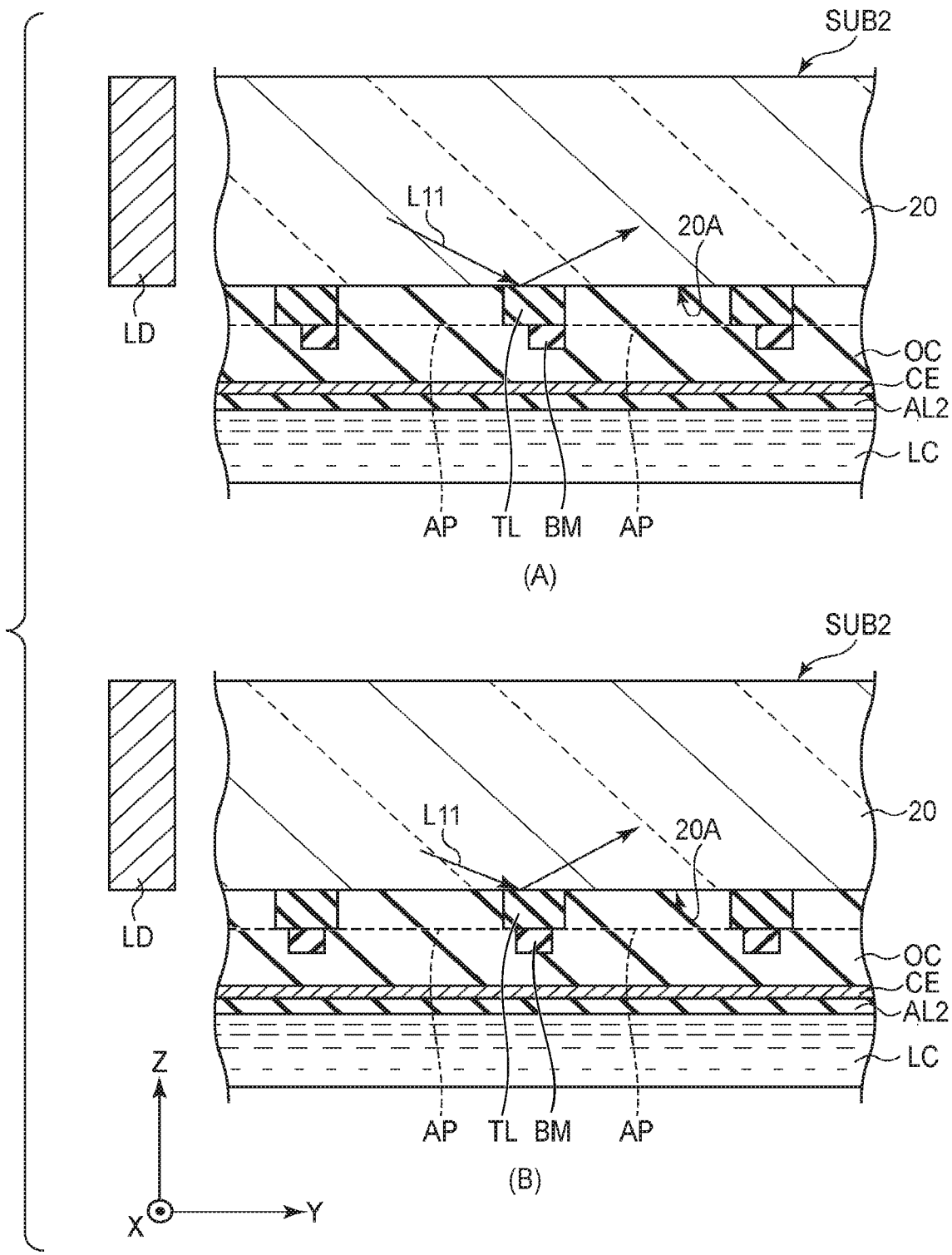
FIG. 5 is a cross-sectional view showing another configuration example of the second substrate SUB2.

FIG. 5 is a cross-sectional view showing another configuration example of the second substrate SUB2. The configuration example of FIG. 5 corresponds to when the light-shielding layer BM is apart from the main surface 20A of the transparent substrate 20. In FIG. 5 (A), the light-shielding layer BM is offset to a side away from the light-emitting element LD of a region overlapping the transparent layer TL between the transparent layer TL and the overcoat layer OC. In FIG. 5 (B), the light-shielding layer BM is disposed at substantially the center of the transparent layer TL between the transparent layer TL and the overcoat layer OC. In both examples, the light-shielding layer BM does not overlap the aperture AP of the transparent layer TL, and is not in contact with the main surface 20A.

Figure 6:
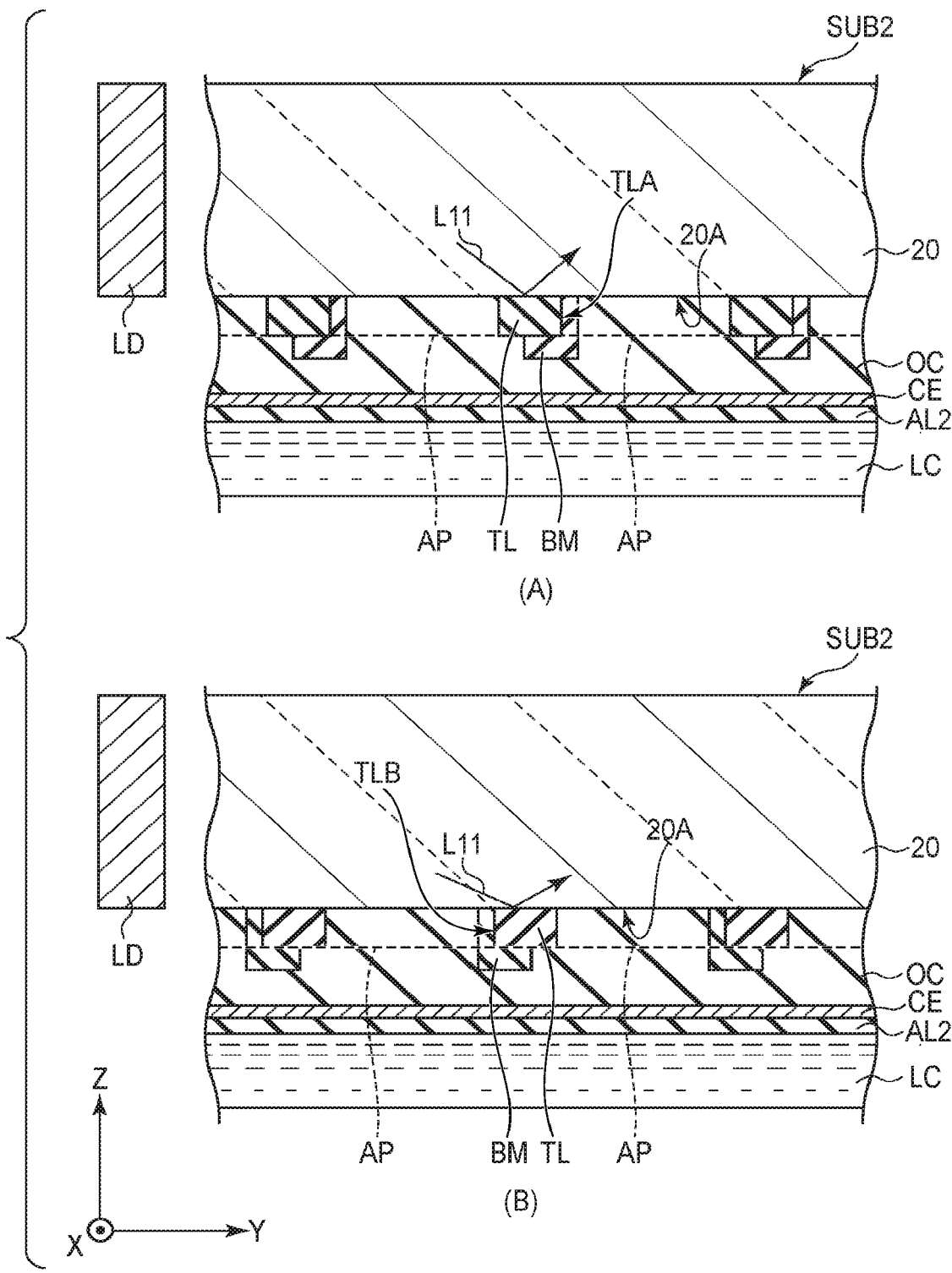
FIG. 6 is a cross-sectional view showing another configuration example of the second substrate SUB2.

FIG. 6 is a cross-sectional view showing another configuration example of the second substrate SUB2. The configuration example shown in FIG. 6 corresponds to when the light-shielding layer BM is in contact with the main surface 20A in the aperture AP. In FIG. 6 (A), the light-shielding layer BM is in contact with the transparent layer TL, and is also in contact with the main surface 20A in the aperture AP on a side far from the light-emitting layer LD. That is, the light-shielding layer BM covers a side surface TLA extending along the first direction X of the transparent layer TL. The side surface TLA is a side surface on a side opposite to the light-emitting element LD in the transparent layer TL. In FIG. 6 (B), the light-shielding layer BM is in contact with the transparent layer TL, and is offset to a side closer to the light-emitting element LD of a region overlapping the transparent layer TL and is in contact with the main surface 20A in the aperture AP. That is, the light-shielding layer BM covers a side surface TLB extending along the first direction X of the transparent layer TL. The side surface TLB is a side surface on a side opposed to the light-emitting element LD in the transparent layer TL.

In these examples, the contact area of the light-shielding layer BM with the main surface 20A is less than the contact area of the transparent layer TL with the main surface 20A. Therefore, as compared with when the transparent layer TL is not disposed, the contact area of the light-shielding layer BM with the main surface 20A can be reduced, and the light absorption by the light-shielding layer BM can be suppressed.

Note that the light-shielding layer BM may cover both of the side surfaces TLA and TLB of the transparent layer TL or the entirety of the transparent layer TL.

Figure 7:
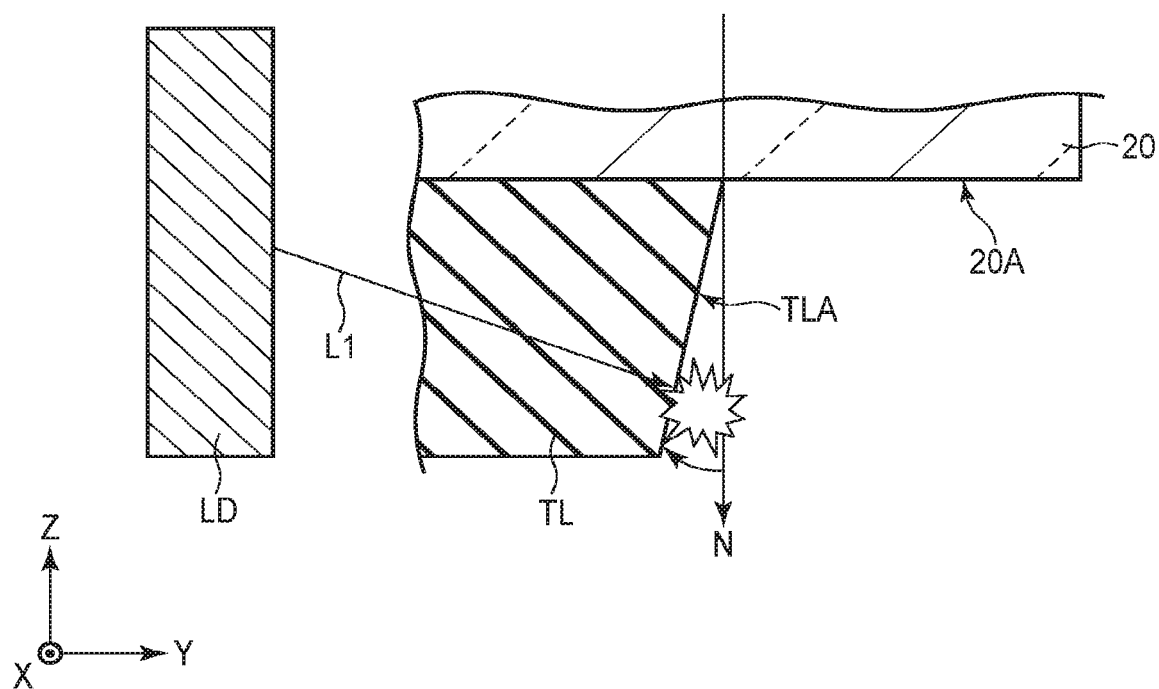
FIG. 7 is a cross-sectional view for explaining undesired scattering at a side surface TLA of a transparent layer TL.

FIG. 7 is a cross-sectional view for explaining undesired scattering at the side surface TLA of the transparent layer TL. The side surface TLA is an inclined surface inclined toward the light-emitting element LD with respect to a normal N of the main surface 20A. Alternatively, the side surface TLA is a surface crossing at an acute angle clockwise with respect to the normal N in a YZ-plane. The light L1 from the light-emitting element LD is reflected at the interface between the transparent substrate 20 and the transparent layer TL as described above. However, if a part of the light L1 enters the transparent layer TL, undesired scattering may occur at the side surface TLA, and this causes degradation of display quality.

In the present embodiment, the light-shielding layer BM covers the side surface TLA as described with reference to FIG. 6 (A). Therefore, undesired scattering at the transparent layer TL can be suppressed.

Figure 8:
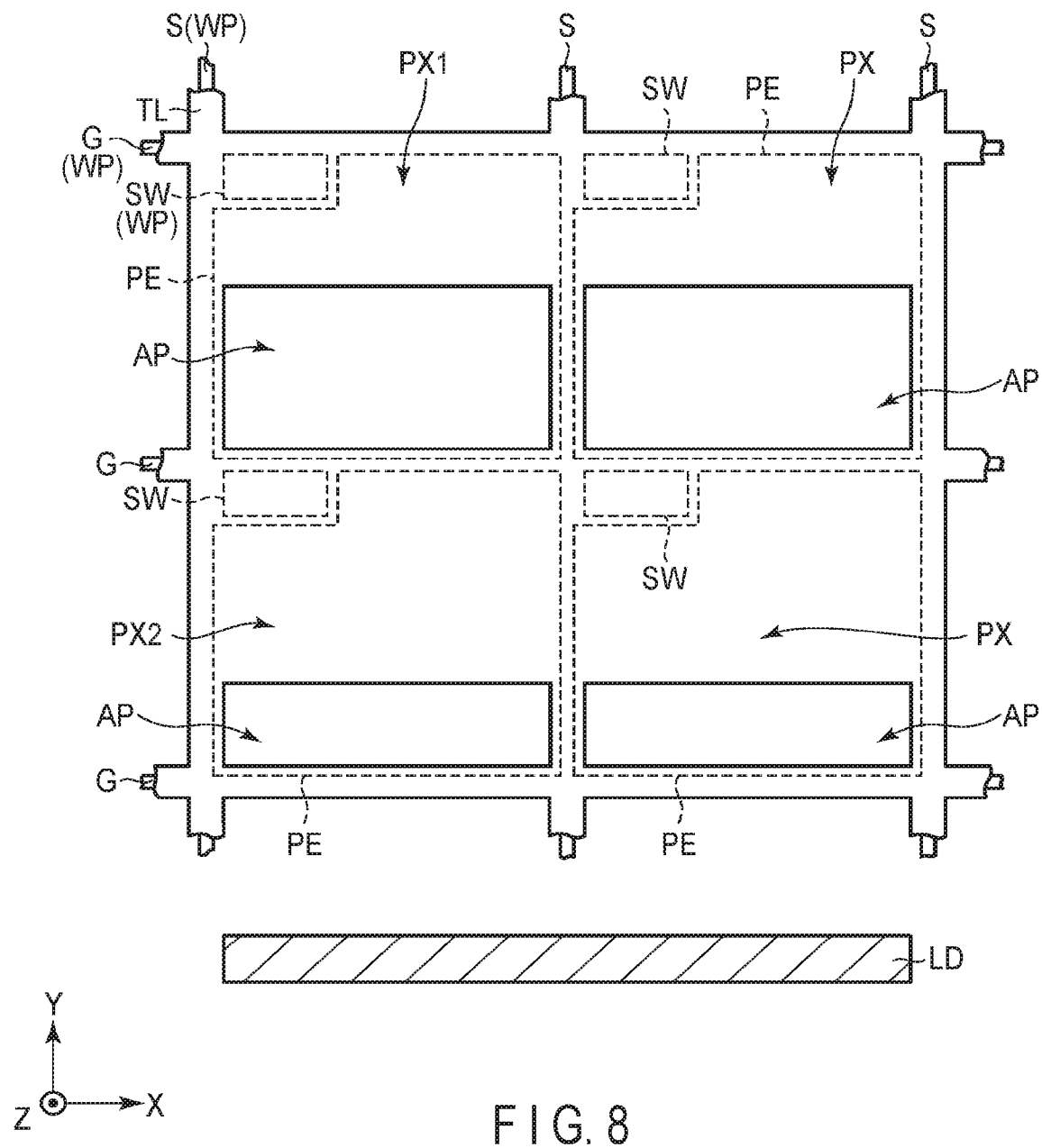
FIG. 8 is a plan view showing another configuration example of the display panel PNL shown in FIG. 1.

FIG. 8 is a plan view showing another configuration example of the display panel PNL shown in FIG. 1. The scanning lines G extend along the first direction X, and are arranged spaced apart from one another along the second direction Y. The signal lines S extend along the second direction Y, and are arranged spaced apart from one another along the first direction X. The switching elements SW are disposed at the intersections of the scanning lines G and the signal lines S. The pixel PX is delimited by the scanning line G and the signal line S.

The transparent layer TL overlaps the wiring portion WP in planar view. That is, the transparent layer TL overlaps the scanning line G, the signal line S and the switching element SW. In addition, the transparent layer TL overlaps one part of the pixel electrode PE. In other words, the aperture AP of the transparent layer TL overlaps the other part of the pixel electrode.

Here, the installation area per pixel of the transparent layer TL is defined as the overlap area of the transparent layer TL and the pixel electrode PE in planar view. A first pixel PX1 and a second pixel PX2 are arranged in the second direction Y. The second pixel PX2 is located between the light-emitting element LD and the first pixel PX1. That is, the first pixel PX1 corresponds to a pixel at a position far from the light-emitting element LD, and the second pixel PX2 corresponds to a pixel at a position close to the light-emitting element LD.

The installation area of the transparent layer TL in the first pixel PX1 is less than the installation area of the transparent layer TL in the second pixel PX2. In other words, the area of the aperture AP overlapping the pixel electrode PE in the first pixel PX1 is greater than the area of the aperture AP overlapping the pixel electrode PE in the second pixel PX2.

In the illustrated example, the aperture AP is formed in a rectangular shape extending along the scanning line G. In addition, in each pixel PX, the aperture AP is disposed on a side close to the light-emitting element LD.

In each pixel PX, the light from the light-emitting element LD enters through the aperture AP but is reflected at the transparent layer TL. Since the first pixel PX1 and the second pixel PX2 are composed as described above, the entry of the light from the light-emitting element LD to the liquid crystal layer LC is suppressed in the second pixel PX2. On the other hand, the entry of the light from the light-emitting element LD to the liquid crystal layer LC is promoted in the first pixel PX1.

As described above, the light from the light-emitting element LD tends to attenuate as it travels farther from the light-emitting element LD. The luminance of light illuminating the first pixel PX1 will be referred to as a first luminance, and the luminance of light illuminating the second pixel PX2 will be referred to as a second luminance. The first luminance is less than the second luminance. On the other hand, the area of the aperture AP of the first pixel PX1 is greater than the area of the aperture AP2 of the second pixel PX2. Therefore, the amounts of light contributing to display can be equalized in the first pixel PX1 and the second pixel PX2.

Figure 9:
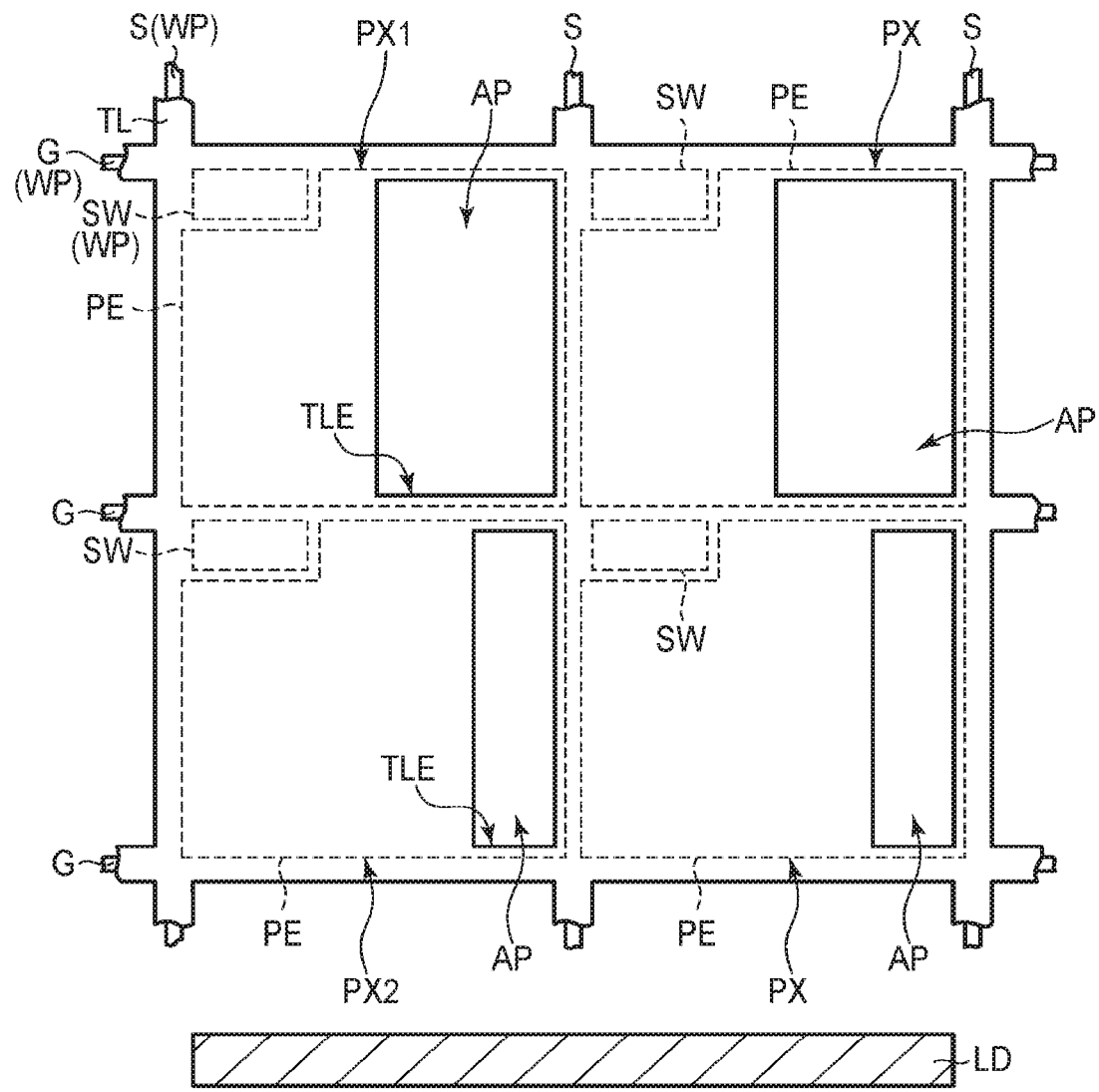
FIG. 9 is a plan view showing another configuration example of the display panel PNL shown in FIG. 1.

FIG. 9 is a plan view showing another configuration example of the display panel PNL shown in FIG. 1. The configuration example shown in FIG. 9 is different from the configuration example shown in FIG. 8 in that the aperture AP is formed in a rectangular shape extending along the signal line S. Similarly to the configuration example shown in FIG. 8, the installation area of the transparent layer TL in the first pixel PX1 is less than the installation area of the transparent layer TL in the second pixel PX2. In addition, the area of the aperture AP of the first pixel PX1 is greater than the area of the aperture AP of the second pixel PX2. Therefore, effects similar to those obtained from the configuration example shown in FIG. 8 can be obtained.

Furthermore, in the transparent layer TL, the length of an edge TLE extending along the first direction X is less than the length along the first direction X of the pixel electrode PE. At the edge TLE, in some cases, the side surface TLA causing scattering described with reference to FIG. 7 is formed. In the configuration example shown in FIG. 9, the length of the edge TLE is reduced, and as a result, undesired scattering can be suppressed.

Figure 10:
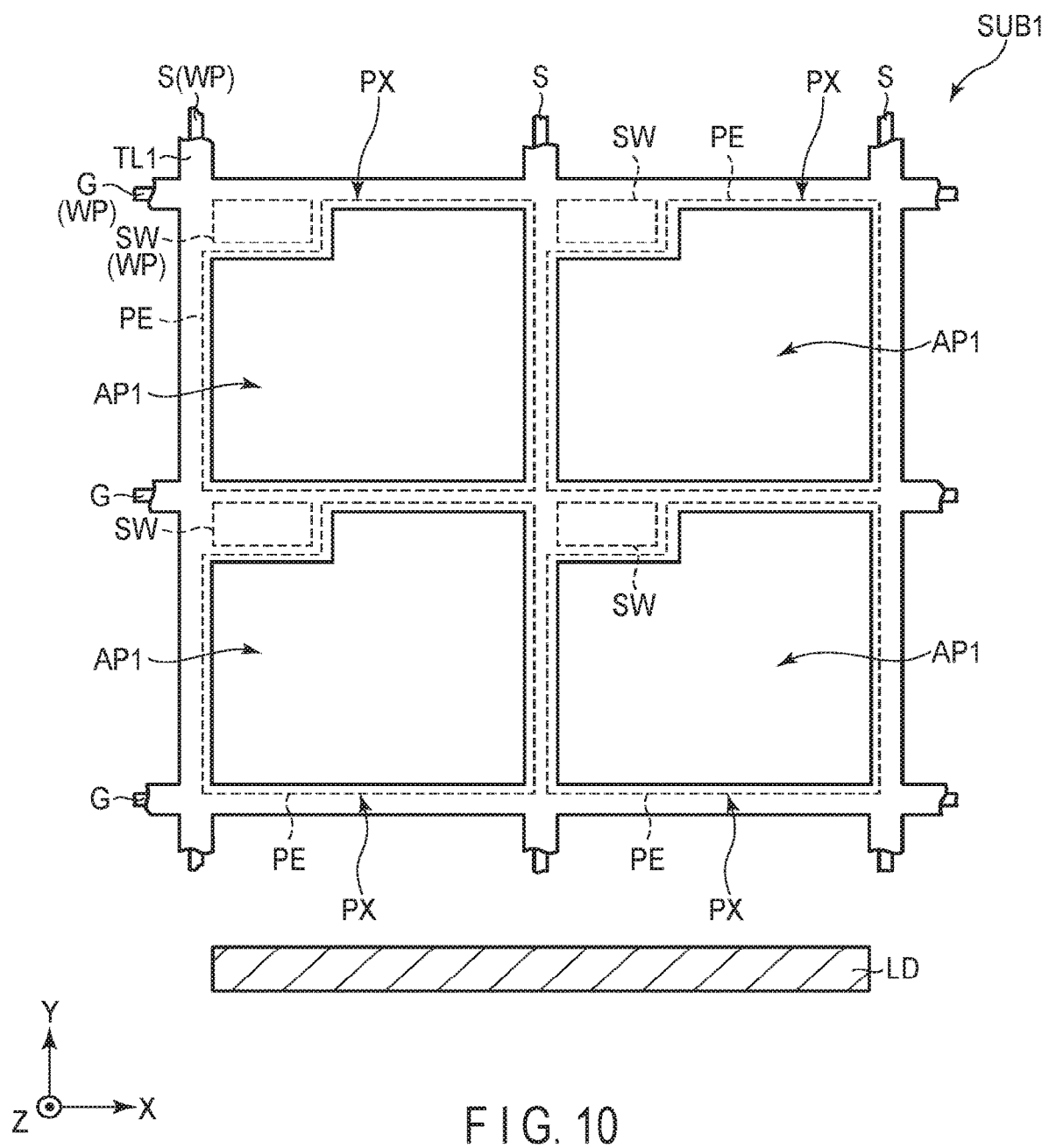
FIG. 10 is a plan view showing another configuration example of the first substrate SUB1.

FIG. 10 is a plan view showing another configuration example of the first substrate SUB1. The first substrate SUB1 of the configuration example shown in FIG. 10 comprises a transparent layer TL1. This first substrate SUB1 can be combined with various second substrates SUB2 comprising the transparent layer TL described above. That is, not only the transparent layer TL is disposed in the second substrate SUB2 as described above, but also the transparent layer TL1 is disposed in the first substrate SUB1. The transparent layer TL1 overlaps the wiring portion WP in planar view. That is, the transparent layer TL1 overlaps the scanning line G, the signal line S and the switching element SW. Note that the transparent layer TL1 may overlap the pixel electrode PE or may not overlap the pixel electrode PE. In the illustrated example, the transparent layer TL1 is formed in a lattice shape, and comprises apertures AP1 overlapping the pixel electrodes PE.

Since the transparent layer TL1 is disposed, the light from the light-emitting element LD less easily reaches the wiring portion WP. Therefore, the light absorption in the wiring portion WP can be suppressed, and the decrease of the luminance can be suppressed. In addition, a current leak due to the entry of undesired light to the switching element SW, and a malfunction of the switching element SW can be suppressed. Furthermore, degradation of display quality due to the reflection of undesired light at the scanning line G and the signal line S can be suppressed.

Figure 11:
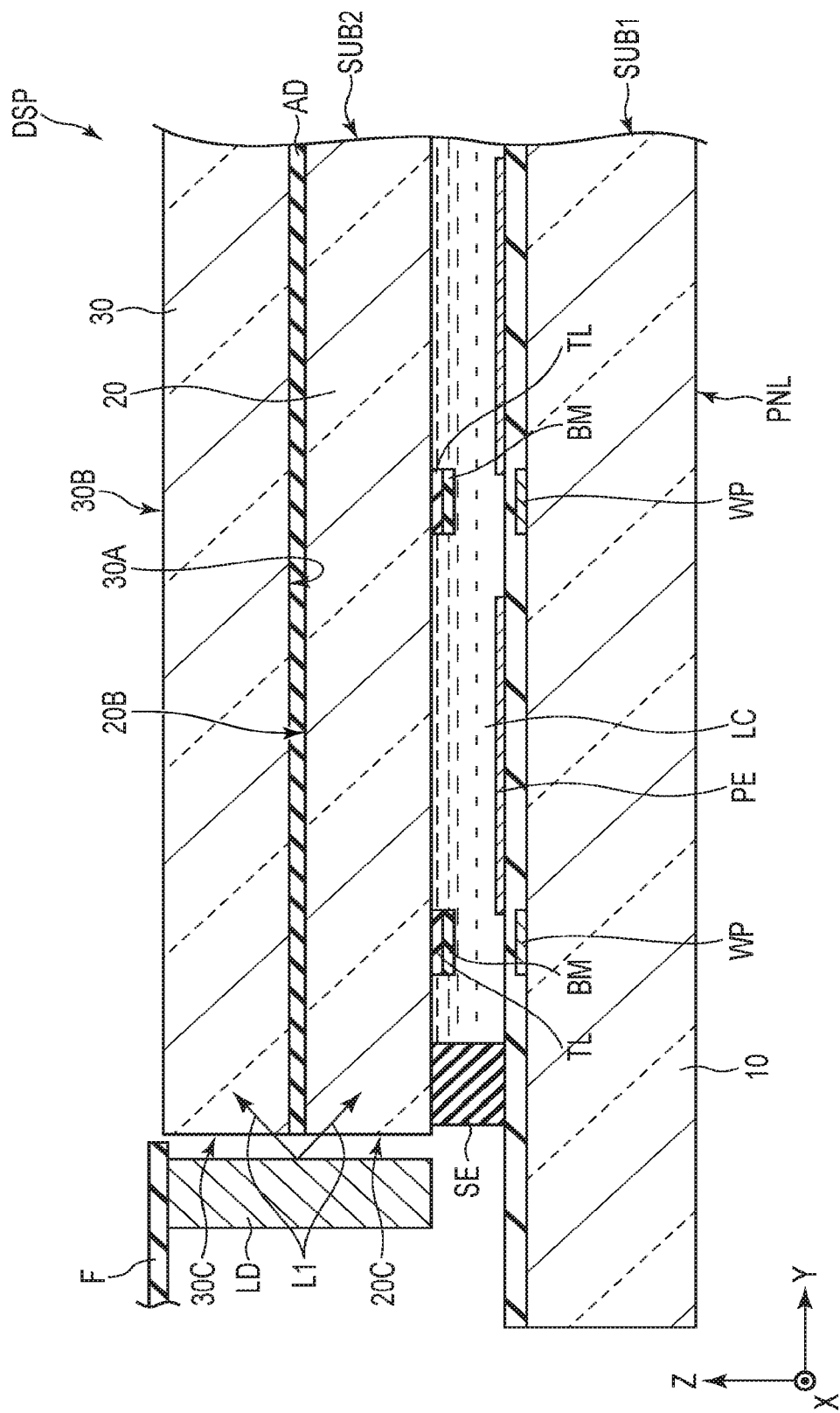
FIG. 11 is a cross-sectional view showing another configuration example of the display device DSP of the present embodiment.

FIG. 11 is a cross-sectional view showing another configuration example of the display device DSP of the present embodiment. The configuration example shown in FIG. 11 is different from the configuration example shown in FIG. 3 in that the display device DSP comprises a transparent substrate 30 bonded to the transparent substrate 20. The transparent substrate 20 is located between the liquid crystal layer LC and the transparent substrate 30 along the third direction Z. The transparent substrate 30 is an insulating substrate such as a glass substrate or a plastic substrate, and has an equal refractive index to the transparent substrates 10 and 20. The transparent substrate 30 comprises a main surface (lower surface) 30A, a main surface (upper surface) 30B on a side opposite to the main surface 30A, and a side surface 30C. A transparent adhesive layer AD is interposed between the main surface 20B of the transparent substrate 20 and the main surface 30A of the transparent substrate 30. The adhesive layer AD has an equal refractive index to the transparent substrates 20 and 30. The light-emitting element LD is opposed to the side surface 20C of the transparent substrate 20 and the side surface 30C of the transparent substrate 30.

In this configuration example, the light L1 emitted from the light-emitting element LD enters the display panel PNL from the side surfaces 20C and 30C.

In the present embodiment, the transparent substrate 10 corresponds to a first transparent substrate, the transparent substrate 20 corresponds to a second transparent substrate, and the transparent substrate 30 corresponds to a third transparent substrate.

As described above, according to the present embodiment, a display device capable of suppressing degradation of display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first substrate comprising a first transparent substrate, a wiring portion, and a pixel electrode electrically connected to the wiring portion;
   a second substrate comprising a second transparent substrate, a common electrode opposed to the pixel electrode, a light-shielding layer overlapping the wiring portion between the second transparent substrate and the common electrode, and a transparent layer disposed between the second transparent substrate and the light-shielding layer;
   a liquid crystal layer disposed between the first substrate and the second substrate and including a stripe-shaped polymer and liquid crystal molecules; and
   a plurality of light-emitting elements, wherein
   a refractive index of the transparent layer is less than a refractive index of the second transparent substrate,
   the transparent layer is an insulating layer comprising an aperture opposed to the pixel electrode,
   the wiring portion comprises a scanning line, a signal line crossing the scanning line, and a switching element electrically connected to the scanning line and the signal line,
   the transparent layer overlaps the scanning line, the signal line, and the switching element in planar view, and
   an area of the transparent layer in a first pixel is less than an area of the transparent layer in a second pixel located between the light-emitting elements and the first pixel.

2. The display device of claim 1, wherein
   the second transparent substrate comprises a main surface opposed to the liquid crystal layer and a side surface opposed to the light-emitting elements,
   the transparent layer is in contact with the main surface, and
   the light-shielding layer is in contact with the transparent layer.

3. The display device of claim 2, wherein the light-shielding layer is apart from the main surface.

4. The display device of claim 2, wherein the light-shielding layer is in contact with the main surface in the aperture.

5. The display device of claim 2, wherein
the second substrate further comprises a transparent organic insulating film, and
the organic insulating film directly covers the transparent layer and the light-shielding layer, and is in contact with the main surface in the aperture.

6. The display device of claim 2, wherein the common electrode directly covers the transparent layer and the light-shielding layer, and is in contact with the main surface in the aperture.

7. The display device of claim 6, wherein
the second substrate further comprises a transparent organic insulating film, and
the organic insulating film directly covers the common electrode.

8. The display device of claim 1, wherein the light-shielding layer is offset to a side away from the light-emitting elements in a region overlapping the transparent layer.

9. The display device of claim 1, wherein the light-shielding layer is offset to a side closer to the light-emitting elements in a region overlapping the transparent layer.

10. The display device of claim 1, wherein the aperture extends along the scanning line.

11. The display device of claim 1, wherein the aperture extends along the signal line.

12. A display device comprising:
a first transparent substrate;
a second transparent substrate comprising a main surface and a side surface;
a liquid crystal layer disposed between the first transparent substrate and the second transparent substrate, and including a stripe-shaped polymer and liquid crystal molecules;
a light-shielding layer disposed between the second transparent substrate and the liquid crystal layer;
a transparent layer disposed between the second transparent substrate and the light-shielding layer, and being in contact with the main surface; and
a light-emitting element opposed to the side surface, wherein
the transparent layer is an insulating layer comprising an aperture, and
an area of the transparent layer in a first pixel is less than an area of the transparent layer in a second pixel located between the light-emitting elements and the first pixel.

13. The display device of claim 12, wherein the light-shielding layer is in contact with the transparent layer, and is apart from the main surface.

14. The display device of claim 12, wherein the light-shielding layer is in contact with the transparent layer, and is in contact with the main surface in the aperture.

15. The display device of claim 12, further comprising a transparent organic insulating film, wherein
the organic insulating film directly covers the transparent layer and the light-shielding layer, and is in contact with the main surface in the aperture.

16. The display device of claim 12, further comprising a transparent electrode directly covering the transparent layer and the light-shielding layer, and
the transparent electrode is in contact with the main surface in the aperture.

17. The display device of claim 12, wherein the transparent layer is formed in a lattice shape in planar view.

* * * * *